Patented Aug. 18, 1936

2,051,217

UNITED STATES PATENT OFFICE 2,051,217

PROCESS OF PREPARING ORGANIC ACID ESTERS OF CELLULOSE

William O. Kenyon and George P. Waugh, Rochester, N. Y., assignors to Eastman Kodak Company, Rochester, N. Y., a corporation of New York No Drawing. Application November 30, 1935, Serial No. 52,422

7 Claims. (Cl. 260—101)

The present invention relates to the preparation of an organic acid ester of cellulose by reacting upon cellulose or an esterifiable cellulose derivative with an esterification bath comprising a mixture of an acyl halide and an alkali salt of an organic acid which does not correspond to the acyl and a diluent. This diluent may be either a solvent or a non-solvent of the resulting ester.

In recent years the mixed organic acid esters of cellulose have come into prominence due to their extended acetone solubility and the possibility of varying their properties by altering the content of the various acyl groups which are present therein. The preparation of those esters has been mainly by means of acid anhydrides reacting upon cellulose or esterifiable cellulose derivatives in the presence of a catalyst such as sulfuric acid. In some cases such as with the dicarboxylic acids that process has been found to be inoperable.

An object of the present invention is to provide a process for the preparation of a mixed organic acid ester of cellulose in which it is unnecessary to employ an organic acid anhydride therein. Another object of our invention is to provide a process in which groups such as of oxalic acid which do not form acid anhydrides may be added to cellulose in the formation of an ester thereof. Another object of our invention is to provide a process for preparing an organic ester of cellulose in which the alkali salt of a fatty acid instead of the more rare anhydride may be employed in the process, thus lessening the cost of preparing the ester. Other objects will appear herein.

We have found that mixed organic esters of cellulose, which are eminently suitable for commercial applications to which cellulose esters are put, may be prepared by reacting upon cellulose or an esterifiable cellulose derivative with an esterification bath comprising a mixture of an acyl halide and an alkali salt of an organic acid, a diluent and an esterification catalyst. We prefer to perform this esterification in two steps namely (1) mixing the salt and the acyl halide in the presence of the diluent and separating from the mixture any of the salt which does not dissolve and (2) reacting upon the cellulose with the filtrate and a small amount of catalyst. When the reaction mixture is not filtered before the cellulose is introduced the salt which has not been removed may combine with the catlyst which is added in the esterification step and thus neutralize its effect. For instance if sulfuric or a like acid is employed an alkaline salt thereof would be formed if the salt of the halide acid is not removed. However, when a perchlorate such as magnesium is employed as the catalyst and a weakly alkaline salt such as of magnesium or calcium is employed the only disadvantage of allowing the salt to remain instead of filtering it off is that it may permeate the cellulose and thus necessitate more washing than would otherwise be necessary.

The following examples illustrate processes which embody the present invention:

Example I 204 lbs. of anhydrous sodium propionate was well mixed with 139 lbs. of acetyl chloride and the mixture was heated for about a half hour at approximately 100° C. A mixture was prepared consisting of 200 lbs. of Stoddard solvent (a petroleum distillate having a boiling range of 150–230° C.) and 60 lbs. of toluene. 165 lbs. of this second mixture was combined with the first and the whole was heated for a few minutes cooled and filtered. The remainder of the second mixture was employed to wash the residue and was then added to the filtrate. The filtrate was then converted into an esterification bath by adding 28 lbs. of 95% acetic anhydride and 5 lbs. of a catalyst consisting of 1 part by volume of sulfuric acid and 3 parts by volume of phosphoric acid. The addition of acetic anhydride was for the purpose of increasing the acetyl content of the bath so that the resulting ester will have a higher acetyl content than it would without this addition. The bath was added to 25 lbs. of cotton linters which had been pretreated for 5 hours with 75 lbs. of glacial acetic acid. After a period of about 48 hours the product was removed from the bath, washed and dried.

One part of the cellulose acetate propionate formed was dissolved in twelve parts of a solvent consisting of 95 parts of ethylene chloride and five parts of ethyl alcohol. A sheet 0.005 inch thick, coated out from this solution, exhibited a tolerance of 26 folds on a Schopper fold tester, a breaking load of 11.3 kg. and a stretch of 20% before the breaking occurs. A sheet of ordinary commercial cellulose acetate having the same thickness (.005 in.) was found to exhibit a tolerance of 11 folds on the same Schopper fold tester. This sheet had a breaking load of 11.6 kg. and a stretch of 22%.

Example II 395 lbs. of anhydrous sodium butyrate was thoroughly mixed with 189 lbs. of acetyl chloride.

The mixture was then heated 8 hrs. at 100° C. A mixture was prepared consisting of 200 lbs. of purified Stoddard solvent and 60 lbs. of toluene. 165 lbs. of this mixture was added to the former mixture of sodium butyrate and acetyl chloride after cooling. The whole was stirred for 20 hrs. at room temperature and was then filtered. The residue removed was washed with the remainder (95 lbs.) of the Stoddard solvent-toluene mixture which second filtrate was added to the first.

The above filtrate was converted into an esterification bath by adding 4.5 lbs. of sulfuric acid thereto. The whole was then added to 25 lbs. of cotton linters which had been pretreated for 5 hrs. at room temperature with 75 lbs. of glacial acetic acid. The mass was maintained at a temperature of 40° C. for 142 hours. The resulting ester was pressed to remove excess esterifying mixture and was washed with 640 lbs. of ethyl alcohol and then with water until the wash water was neutral to litmus. A white fibrous product, soluble in ethylene chloride-methyl alcohol (95:5) was obtained.

Although in the carrying out of the present invention the sodium salts of the organic acids will obviously be most commonly employed, other alkaline salts of those acids such as of potassium, ammonium, magnesium, calcium, strontium, and barium would be suitable in this connection.

The acid chlorides are the most common of the acylhalide compounds and will ordinarily be employed, however, the other halide compounds such as the fluorides, bromides or iodides may be used in this connection. Other compounds comprising the combination of the acyl radical of an organic acid and the negative radical of an inorganic acid may be employed by those skilled in the art in a process in accordance with our invention.

It will be noted in the above examples that an amount of catalyst is employed in excess of that ordinarily employed in cellulose esterification processes from which one might infer that a more intense catalytic action is necessary in processes embodying the present invention. Such is not the case. The excess of catalyst is necessary due to the incomplete insolubility of the alkaline salt in the non-solvent, which salt reacts with the catalyst when it is added and neutralizes a portion of the total amount employed. It may thus be seen that the amount of catalyst such as sulfuric acid added to the reaction mixture is governed to some extent by the amount of alkaline salt which may dissolve. For instance sodium propionate is more completely insoluble in the ingredients of the esterification mixture than is sodium butyrate so that it is usually necessary to add more catalyst when the more soluble sodium butyrate is employed.

In a process carried out in accordance with the present invention some other non-solvent than that given in the examples may be employed. However that non-solvent is eminently suitable due to its effective non-solvent power in regard to the esters formed and the salts which are employed. Other non-solvents such as the aromatic hydrocarbons, and the like are suitable for use in processes embodying the present invention. Obviously it is important that water be excluded as much as is practically possible as acetyl chloride is decomposed by water and the sodium salt of an organic acid is soluble therein which is undesirable in this process.

Oftentimes when a petroleum distillate is employed in an esterification process such as this it is characterized by a blackening in the process. It is preferred that the distillate be purified before use to eliminate this darkening. In the case of the petroleum distillate employed in the above examples that material before use was first subjected to the action of an equal volume of fuming sulfuric acid containing 50% sulfur trioxide for 48 hours at room temperature with occasional agitation. The distillate was then decanted from the acid and was washed, dried and distilled. A weaker acid such as one containing 20% $SO_3$ may be employed, however, a longer treatment or a higher temperature or both may be necessary in that case to properly purify the oil.

As was pointed out above the present invention is applicable also to processes in which esterifiable cellulose derivatives are employed as the starting material. A hydrolyzed cellulose acetate for instance might be employed as the starting material in a process employing sodium butyrate and an unsubstituted acyl chloride such as propionyl chloride, and a cellulose acetate propionate butyrate would result.

It is also to be understood that the employment of the substituted acyl halides is within the scope of our invention by which means the simple as well as the mixed esters of cellulose may be prepared. For example a cellulose butyrate may be prepared by employing sodium butyrate and chloracetyl chloride in the process as it has been found that the halogeno- and alkoxy-substituted acyl chlorides do not themselves contribute organic acid groups to the resulting ester but appear to merely aid the reaction. The following example illustrates a process embodying our invention in which a substituted acyl chloride is employed:

Example III 277 gms. of sodium stearate was thoroughly mixed with 102 gms. of chloracetyl chloride and the whole was refluxed for 5 hours at 100° C. The mass was filtered while hot and the residue was washed with 200 c. c. of hot ethylene chloride, which latter was mixed with the filtrate. 2 c. c. of a catalyst consisting of 1 volume of sulfuric and 3 volumes of phosphoric acid was then added to the filtrate which was then mixed with 50 gms. of cellulose acetate having an acetyl content of approximately 35%. The mixture was maintained at 53° C. for 42 hours forming a dope which was diluted with ethylene chloride, filtered thru a screen and was then precipitated in methyl alcohol. To purify the ester it was washed several times with methyl alcohol, then redissolved in ethylene chloride and reprecipitated and washed with methyl alcohol. When it was free of stearic acid the ester was dried. It was found to be soluble in benzene, ethylene chloride, acetone and chloroform in none of which the starting material was soluble.

We claim as our invention:

1. A process of preparing a mixed fatty acid ester of cellulose which comprises mixing together the halide of a fatty acid either substituted or unsubstituted and the salt of a fatty acid differing from that corresponding to the halide, filtering, adding a diluent and an acylation catalyst thereto and reacting upon cellulose or an esterifiable cellulose derivative with the resulting bath.

2. A process of preparing a mixed fatty acid ester of cellulose which comprises mixing together a fatty acid halide and the salt of a fatty acid differing from that corresponding to the halide, filtering, adding a non-solvent and an acylation catalyst thereto and reacting upon cellulose with the resulting bath.

3. A process of preparing a mixed fatty acid ester of cellulose which comprises mixing together a fatty acid chloride and the alkali metal salt of a fatty acid differing from that corresponding to the chloride, filtering, adding a non-solvent and an acylation catalyst thereto and reacting upon cellulose with the resulting bath.

4. A process of preparing a cellulose acetate propionate which comprises mixing together acetyl chloride and sodium propionate, filtering, adding a non-solvent and an acylation catalyst thereto and reacting upon cellulose with the resulting bath.

5. A process of preparing a mixed fatty acid ester of cellulose which comprises mixing together a fatty acid chloride and the sodium salt of a fatty acid differing from that corresponding to the chloride, filtering, adding a non-solvent and an acylation catalyst thereto and reacting upon cellulose with the resulting bath.

6. A process of preparing a cellulose acetate butyrate which comprises mixing together acetyl chloride and sodium butyrate, filtering, adding a non-solvent and an acylation catalyst thereto and reacting upon cellulose with the resulting bath.

7. A process of preparing a mixed fatty acid ester of cellulose which comprises mixing together sodium stearate and chloracetyl chloride, filtering, adding a diluent and a acylation catalyst thereto and reacting upon an esterifiable cellulose derivative with the resulting bath.

WILLIAM O. KENYON.
GEORGE P. WAUGH.